March 15, 1927.

F. J. TOPPING

HEADLIGHT SHIELD

Filed June 12, 1926          2 Sheets-Sheet 1

F. J. Topping
Inventor

By C. A. Snow & Co.
Attorneys

March 15, 1927.

F. J. TOPPING 1,621,181

HEADLIGHT SHIELD

Filed June 12, 1926    2 Sheets-Sheet 2

F. J. Topping,
Inventor

Patented Mar. 15, 1927.

1,621,181

UNITED STATES PATENT OFFICE.

FRANK J. TOPPING, OF CLIFTON FORGE, VIRGINIA.

HEADLIGHT SHIELD.

Application filed June 12, 1926. Serial No. 115,567.

The present invention has reference to motor vehicle headlights and aims to provide means for mounting the headlights so that they may be tilted by the operator, to illuminate the ground surface directly in front of the vehicle and at the same time avoid blinding drivers of approaching motor vehicles, by the light rays.

Another object of the invention is to provide shields so arranged with respect to the headlamps that they will control the light rays projected by the lamps to confine the light rays to positions on the road surface to properly illuminate the road surface.

A still further object of the invention is the provision of a pivoted shield operating in conjunction with the headlights to automatically assume its proper shielding position, regardless of the distances the headlamps are tilted.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
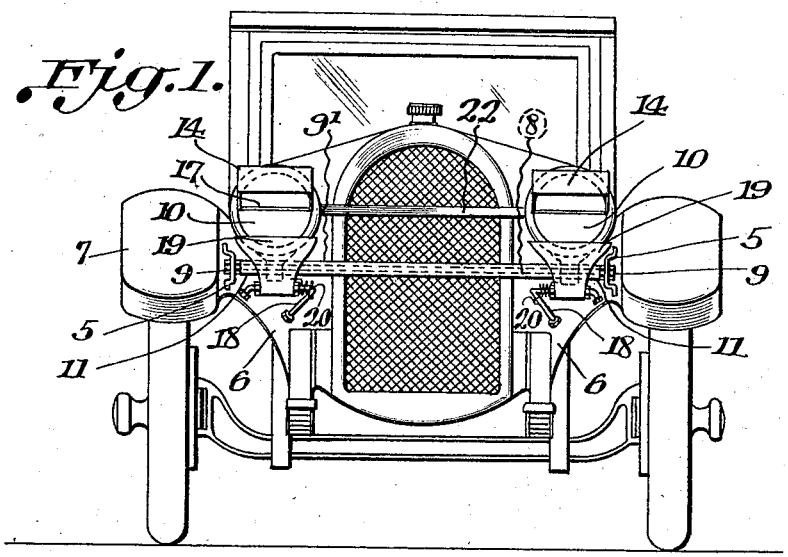
Figure 1 is a front elevational view of a motor vehicle equipped with headlamps constructed in accordance with the invention.
Figure 2:
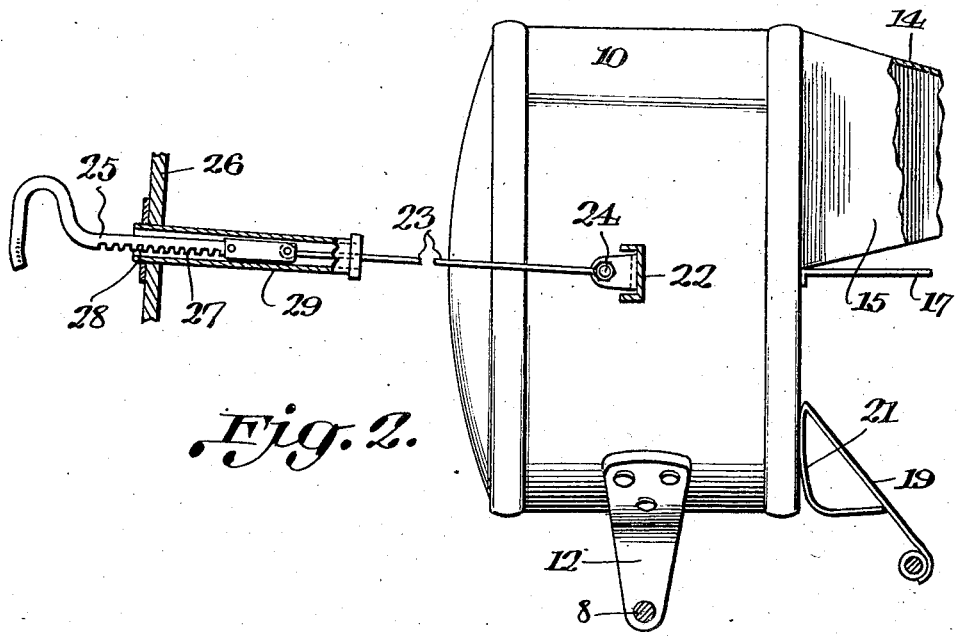
Figure 2 is a side elevational view of a headlamp of the movable type.

Referring to the drawings in detail, the reference character 5 indicates brackets that are secured to the aprons 6 of the mud guards of a motor vehicle.

The reference character 8 indicates a supporting rod that is provided with threaded extremities to accommodate the nuts 9 that are positioned on opposite sides of the bracket members 5 to secure the rod 8 in position.

Tubular members 9' are mounted on the rod 8 and act to hold the lamps, which are indicated at 10, in proper spaced relation with each other, while the sleeves 11 at the ends of the rod 8 act to hold the lamps in proper spaced relation with the brackets 5 to insure the true operation of the headlights.

Secured to the headlights are brackets 12 that are formed with openings through which the rod 8 extends in such a way that the headlights may move freely when operated.

Figure 3:
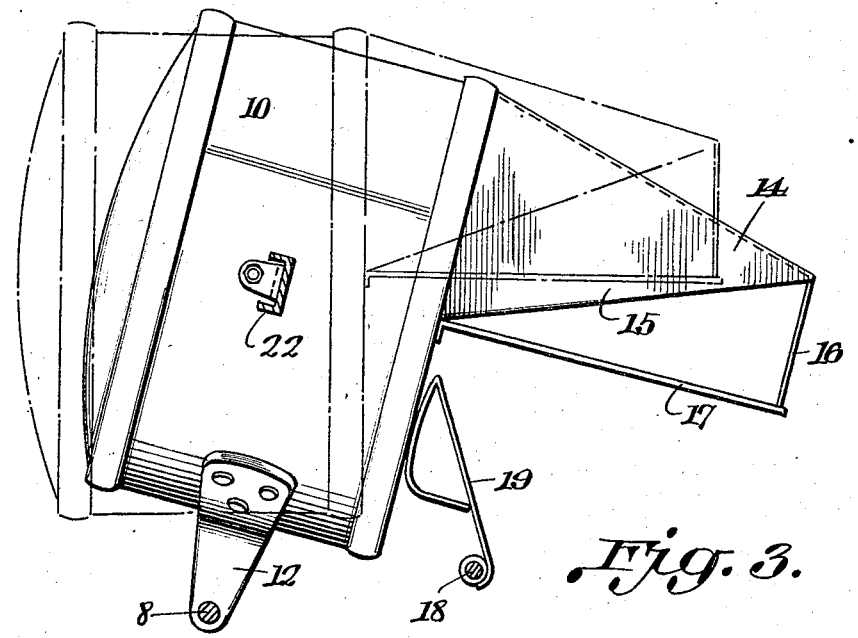
Figure 3 is a side elevational view showing the headlight as tilted forwardly to illuminate the road surface directly in front of the motor vehicle.
Figure 4:
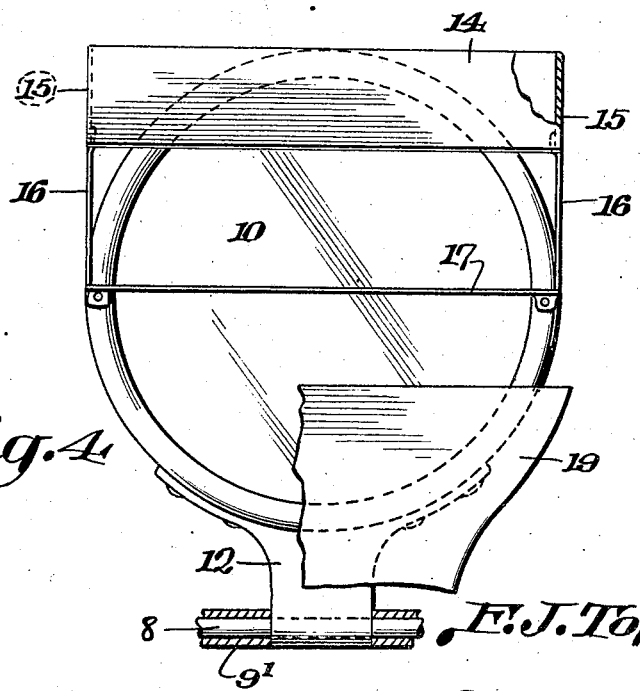
Figure 4 is an elevational view of a headlight, the same being partly broken away to illustrate the manner of supporting the same.

Mounted on each headlight and disposed adjacent to the upper portion thereof is a hood 14, which hood embodies side members 15 and depending rods 16 at the outer end thereof, which rods provide means for supporting the forward end of the horizontal shield 17 forming a part of the hood, the inner end of the shield being secured to the forward portion of the headlight associated therewith as clearly shown by Figure 3 of the drawings.

As illustrated by Figure 3 the shield 17 is disposed at points substantially intermediate the upper and lower edges of the headlight so that the light rays projected by the headlight will be divided.

Secured to the aprons are brackets 18 that support the shields 19 that are pivotally supported and normally urged towards the headlights by means of the springs 20. Each of these shields 19 is of a size to cover the lower portion of the headlight associated therewith, and is provided with a downwardly and rearwardly extended portion 21 adapted to rest against the forward edge of the headlight so that movement of the headlight will be transmitted to the shield.

The reference character 22 indicates a rod that connects a pair of headlights, so that movement of one headlight will result in a relative movement of the adjacent headlight, and to this end a rod 23 is provided, the same having pivotal connection with one of the headlights as at 24.

The rod 23 connects with the finger piece 25 that extends through the dashboard 26 of the motor vehicle so that the finger piece will be easily accessible to the operator of the vehicle.

On the under edge of the finger piece 25 are teeth 27 that engage the lug 28 formed at one end of the tubular housing 29 through which the finger piece operates so that the operator may move the headlights to a proper position, and release the finger piece 25, whereupon the headlights will be held or locked in their adjusted positions, until the finger piece 25 has been disengaged with the lug 28.

It is believed that in view of the foregoing description, a further detail description as to the operation of the headlight is unnecessary.

I claim:

1. In a device of the character described, a horizontally disposed supporting shaft, lamps mounted for pivotal movement on the supporting shaft, shields pivotally supported in front of the lamps and having their forward edges resting against the forward edges of the lamps, means for tilting the lamps, and said shields adapted to move over the forward portions of the lamps to shield the forward portions of the lamps when the lamps are tilted.

2. In a device of the character described, a supporting shaft, lamps on the shaft, means for swinging the lamps in vertical planes, hoods on the upper portions of the lamps, shields pivotally supported in front of the lamps, said shields having downwardly extended portions contacting with the front surfaces of the lamps, means for normally urging the shields into engagement with the lamps, and said shields adapted to move over the forward edges of the lamps when the lamps are tilted downwardly.

In testimony that I claim the foregoing as my own I have hereto affixed my signature.

FRANK J. TOPPING.